Oct. 10, 1939.　　　G. A. LYON　　　2,175,208
HORN BLOWER
Filed March 22, 1937　　　3 Sheets-Sheet 1

Inventor
GEORGE ALBERT LYON.

Oct. 10, 1939.  G. A. LYON  2,175,208
HORN BLOWER
Filed March 22, 1937   3 Sheets-Sheet 2
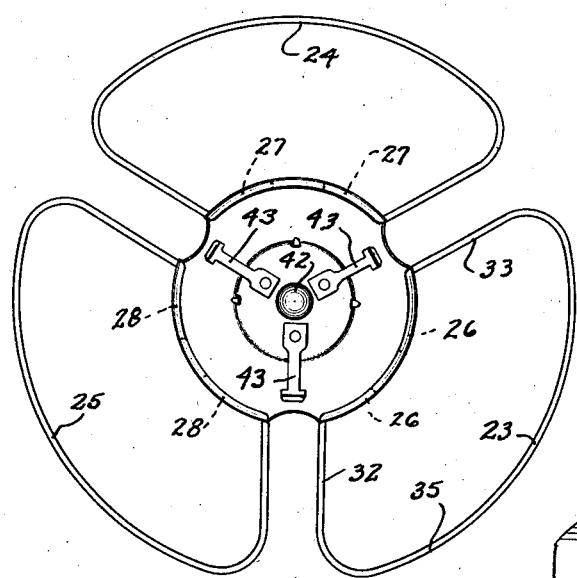
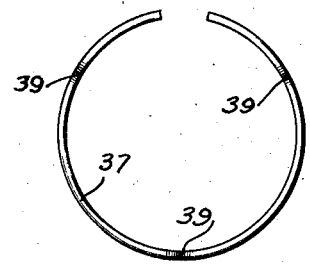
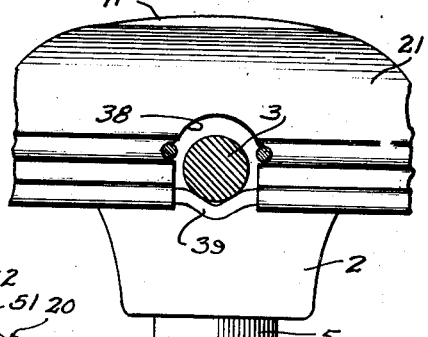
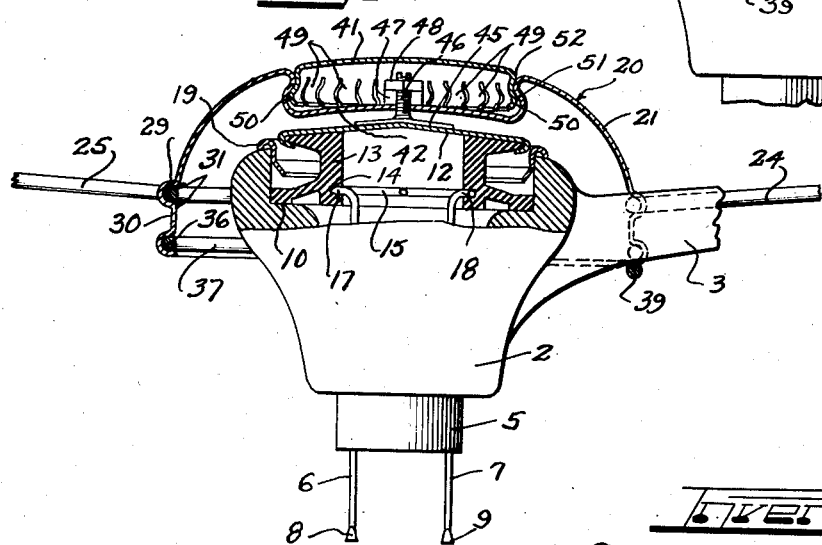
Inventor
GEORGE ALBERT LYON.
by Charles Hull
Attys.

Oct. 10, 1939.　　　　G. A. LYON　　　　2,175,208
HORN BLOWER
Filed March 22, 1937　　　3 Sheets-Sheet 3
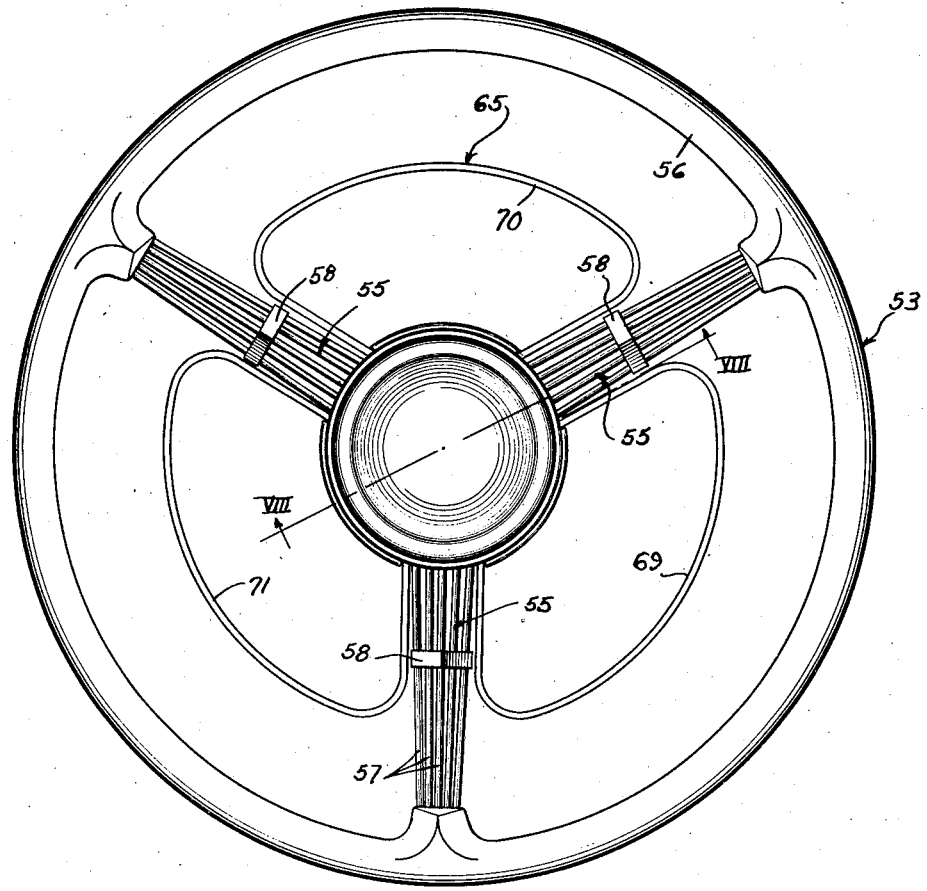
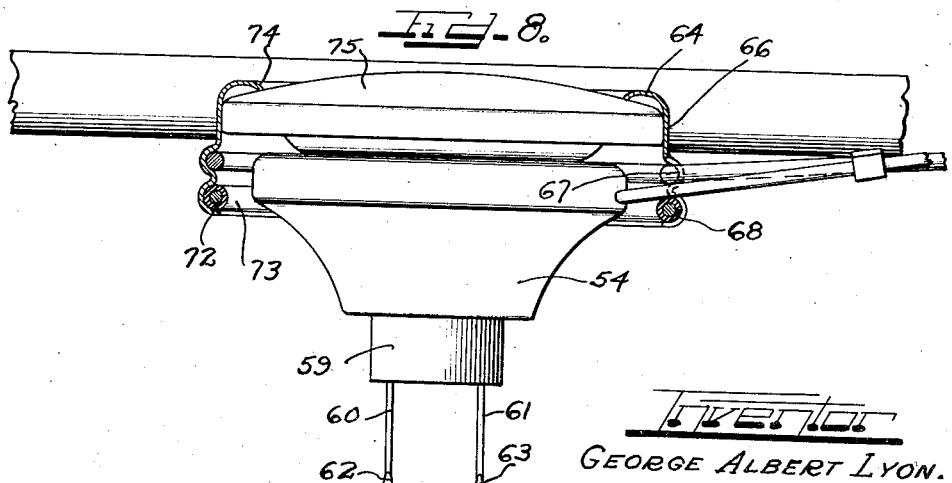
Inventor
GEORGE ALBERT LYON.
by Charles W. Hill
Attys.

Patented Oct. 10, 1939

2,175,208

UNITED STATES PATENT OFFICE 2,175,208

HORN BLOWER

George Albert Lyon, Allenhurst, N. J.

Application March 22, 1937, Serial No. 132,304

20 Claims. (Cl. 74—484)

This invention relates to an auxiliary member for circuit closing devices, and more particularly to horn blower accessories and the like.

Many arrangements have, of course, been provided for facilitating operation of horn actuating mechanisms and other circuit closing elements which are usually found centrally mounted on the upper side of the steering wheel of an automotive vehicle. Such circuit closing elements are usually in the form of a button which is adapted to be depressed manually to make the necessary electrical circuit closing contact. This particular type of construction renders it necessary for the driver to free one hand in order to depress the button to the desired extent. Since this is inconvenient, oftentimes undesirable, and occasionally dangerous, it is desirable to provide some auxiliary mechanism or structure which will permit operation or depression of the circuit closing element or button without requiring the driver to remove one of his hands from the steering wheel.

Many arrangements have been employed in the past which permit blowing of the horn by operating the mechanism with the thumb of either hand while the hands remain on the steering wheel. The majority of these devices are not accessories for the ordinary horn button commonly found on motor vehicles, but they are rather constructions which must be built into the steering wheel assembly at the factory before the motor vehicle is shipped out to the consumer. A few arrangements are known which may be mounted on the steering wheel assembled after the motor vehicle has once been built and shipped, but these mechanisms are relatively complex to assemble and costly to manufacture. In designing auxiliary members for circuit closing elements of the type referred to above, it has been found that an extremely effective form may be obtained by providing a clover-leaf outer portion for manual manipulation and a novel central portion which is adapted to be detachably secured to the steering wheel by means of a split ring which can be snapped into engagement therewith around the hub of the steering wheel and below the spokes of the steering wheel. This type of an arrangement is particularly advantageous since the disposition of the leaf segments of the outer cloverleaf portion between adjacent spokes of the steering wheel permits the entire outer portion of the auxiliary member to be disposed below the plane of the top side of the spokes of the steering wheel. This eliminates all danger due to auxiliary equipment being mounted above the spokes of the steering wheel where it will interfere with the free steering operation of the driver.

It is an object of this invention to provide a novel auxiliary member for circuit closing elements possessing the above highly desirable characteristics. Another object of this invention is to provide a novel auxiliary member for circuit closing elements which is economical to manufacture, which may be easily assembled in desired position on the steering wheel by the ordinary layman, and which is rugged and reliable in use.

A further object of this invention is to provide a novel auxiliary member for circuit closing elements having an outer open clover-leaf portion through which manual manipulation of the circuit closing element is effected. A still further object of this invention is to provide a novel accessory for circuit closing elements on steering wheels which may be detachably mounted on the latter in a novel manner.

Still another object of this invention is to provide a novel horn blower accessory for disposition over a horn button on a steering wheel including resilient means for relieving the horn button of the weight of the accessory.

Another and further object of this invention is to provide a novel horn accessory having a central portion for disposition over a horn button on a steering wheel and means for adjusting the spacing between the central portion of the horn accessory and the horn button.

Another and still further object of this invention is to provide a novel emblem plate and means for detachably securing the same to a horn accessory.

Still another object of this invention is to provide a novel auxiliary member for disposition over a centrally mounted depressible circuit closing element on a steering wheel including cushioned means for engaging the under side of the spokes of the steering wheel.

The novel features which I believe to be characteristic of my invention are set forth with particularity in the appended claims. My invention itself, however, both as to its organization and manner of construction, together with objects and advantages thereof, may best be understood by reference to the following description, taken in connection with the accompanying drawings, in which:

Figure 3 is a plan view of the under side of the auxiliary member illustrated in Figure 1;

Figure 4 is a plan view of the split ring which secures the auxiliary member of Figure 3 to the steering wheel;

Figure 5 is a fragmentary elevational view partly in cross section taken along the line V—V of Figure 1;

Figure 6 is a fragmentary elevational view similar to Figure 2 showing a modification of the preferred embodiment of the invention illustrated in Figures 1 to 5;

Figure 7 is a plan view of a differet embodiment of the present invention mounted on a steering wheel of the "banjo" type; and Figure 8 is a fragmentary elevational view partly in cross section taken along the line VIII—VIII of Figure 7.

Figure 1:
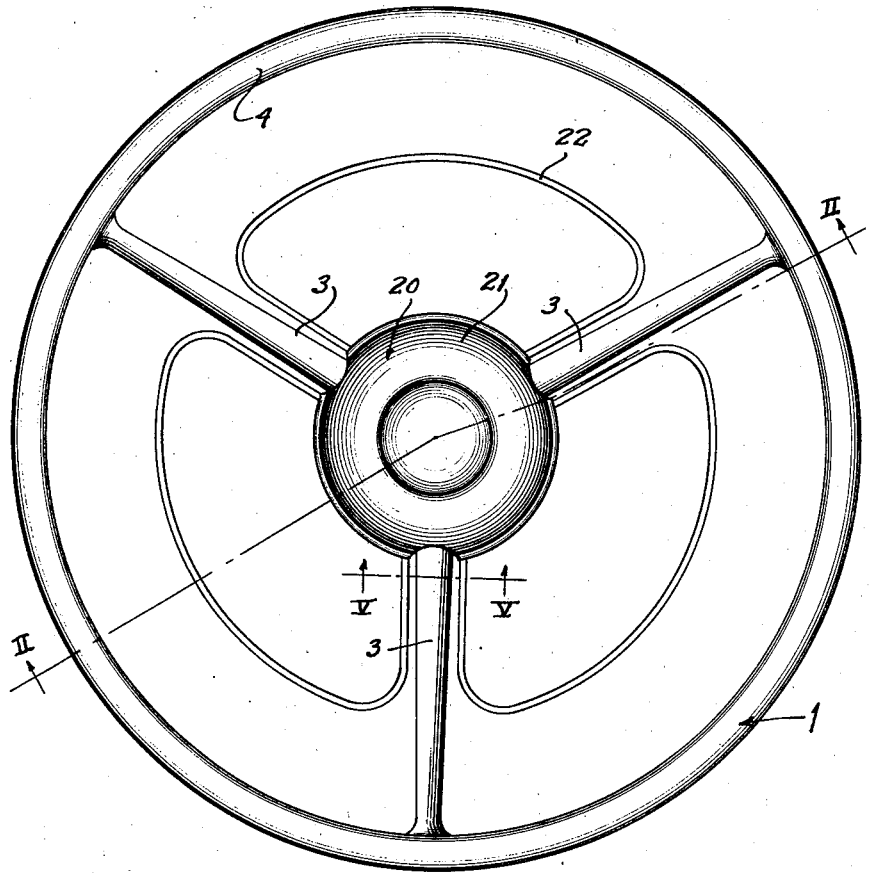
Figure 1 is a plan view of a steering wheel and an auxiliary member embodying certain of the novel features of the present invention.
Figure 2:
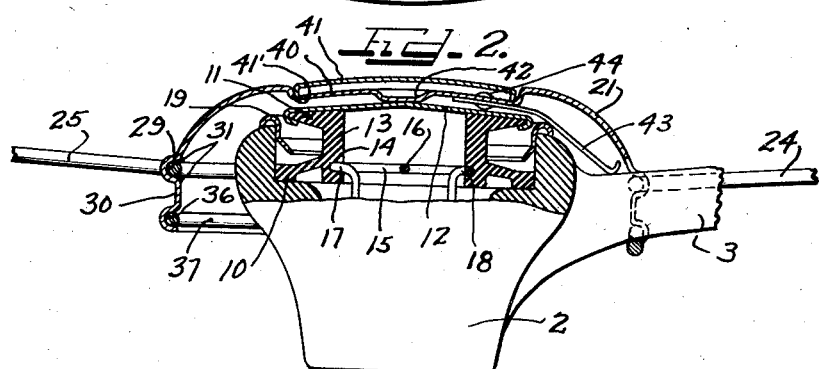
Figure 2 is a fragmentary elevational view partly in cross section taken along the line II—II of Figure 1.

Referring now to the embodiment of the invention illustrated in Figures 1 to 5 of the drawings, there is shown at 1 a steering wheel of the type commonly employed on present-day automotive vehicles. Steering wheel 1 includes in general a central hub portion 2, a plurality of radial spokes 3, and a rim 4. As is the usual practice, steering wheel 1 is preferably formed of hard rubber, some suitable resinous condensation product, or other suitable plastic material. A metallic inner hub 5 is preferably formed within the hub 2 and arranged for direct engagement with the steering rod (not shown). Inner hub 5 is provided with apertures to permit the horn blowing or other switching mechanism actuating prongs 6 and 7 to extend therethrough. Actuating prongs 6 and 7 are preferably flattened at their lower extremities as at 8 and 9 for engagement with the switch mechanism and the circuit to be closed thereby.

The upper end of the hub 2 of steering wheel 1 is recessed as at 10 to permit mounting therein of the circuit closing element actuating mechanism 11. This mechanism includes in general a circuit closing element or button 12, and a resilient supporting member 13 composed of flexible rubber or some other suitable resilient material. Resilient supporting member 13 is provided with an inwardly facing groove 14 into which a wire member 15 is adapted to be mounted. Wire member 15 is so bent at the top that a portion 16 thereof extends centrally across the opening in the supporting member 13, and other portions 17 and 18 thereof are disposed in groove 14. Wire member 15 also includes two downwardly extending free ends 6 and 7 which form the switch mechanism actuating prongs previously referred to. In order to ornament the exterior end of recess 10 of hub 2 and to prevent relatively large foreign particles from falling into this recess when no horn accessory is used, a collar 19 is usually provided therefor, (see Figure 2). It is to be understood that downward depression of the circuit closing element 12 through the application of pressure at any point on the upper surface thereof will effect operation of the switching mechanism (not shown) with which the actuating prongs 6 and 7 engage.

In accordance with the teachings of the present invention, a novel auxiliary member 20 for actuating the circuit closing element 12 is provided for disposition over steering wheel 1. The auxiliary member 20 includes a central portion 21 and a clover-leaf outer portion 22. As may be seen best in Figures 1 and 3 of the drawings, outer portion 22 is formed of three wires or metallic rods 23, 24, and 25 which have their inner ends 26, 27, and 28 respectively secured within a groove 29 in the downwardly extending outer marginal portion 30 of central portion 21. Inner ends 26, 27, and 28 are preferably soldered, welded, or otherwise suitably secured to the central portion 21 as is indicated at 31. From the points at which the wire or rod 23 emerges from groove 29, it is bent radially outwardly as at 32 and 33 in substantial parallelism to the spokes 3 of the steering wheel 1. The central portion of rod 23 which extends between portions 32 and 33 is generally in the shape of an arc of a circle as is indicated at 35. Wires or rods 24 and 25 are similarly mounted within the groove 29 and bear the same general shape as wire or rod 23. It will thus be seen that the general appearance of the outer portion 22 of the auxiliary member 20 is that of a clover leaf and hereinafter this expression will be used to designate the general configuration presented by a construction of this character.

The means by which the auxiliary member 20 is detachably secured to the steering wheel 1 is obtained by providing the outer downwardly extending marginal portion 30 of central portion 21 with a second groove 36 into which a resilient split ring 37 is adapted to be snapped (see Figure 4). By cutting out portions as is indicated at 38 in Figure 5, for accommodating spokes 3 of steering wheel 1, the downwardly extending outer marginal portion 30 of central portion 21 may be extended to a point slightly below the under sides of the spokes 3 of steering wheel 1. By snapping resilient split ring 37 into groove 36 after the auxiliary member 20 has been disposed over the top of the steering wheel 1, it will be at once apparent that due to the fact that the resilient split ring 37 bears against the underside of spokes 3 the auxiliary member 20 is detachably retained in desired position on the steering wheel. If desired, the resilient split ring 37 may be slightly bent as at 39 to better engage the undersides of the spokes 3. To remove the auxiliary member 20 from the steering wheel 1, it is simply necessary to snap the resilient ring 37 out of its groove 36. The auxiliary member 20 may be thereafter lifted up and away from the steering wheel 1.

The top of the central portion 21 of the auxiliary member 20 is preferably recessed as at 40 for the purpose of receiving an ornamental emblem plate 41 which may be secured therein in any suitable manner such as by a plurality of tabs 41'. The center of the recess portion 40 is preferably bulged downwardly as at 42 for direct contact with the circuit closing element or button 12.

Since the weight of the auxiliary member 20 might effect operation of the circuit closing element 12 by overcoming the biasing force of the resilient button support 13, a plurality of resilient spring fingers 43 are riveted or otherwise suitably secured as at 44 to the central portion 21 and are arranged to extend down into member-supporting engagement with spokes 3. It will thus be apparent that the resilient fingers 43 counteract the force of gravity caused by the weight of the auxiliary member 20 and therefore no change in the ordinary resilient support 13 for the circuit closing element need be made when the auxiliary member 20 is installed. Resilient fingers 43 are preferably secured to the recessed portion 40 of central portion 21 when rivets or the like are used since the ornamental emblem plate 41 will hide these rivets from view and thus prevent any detraction from the ornamental appearance of the auxiliary member 20.

In Figure 6 of the drawings a modification is shown wherein the contact pressure of the auxiliary member on the circuit closing element may be adjusted and wherein a different form of ornamental emblem plate is employed. Those portions of Figure 6 which are similar to corresponding portions in Figure 2 have been given the same reference characters.

Due to slight structural deviations in commercial manufacturing processes, it is sometimes desirable to provide an auxiliary member having means whereby the contact pressure and the circuit closing elements may be adjusted. In the modification shown in Figure 6, the center bulge 42 of the preferred embodiment of the invention has been omitted and in its place an adjustable contact element 45 has been substituted. The contact element is provided with an upwardly extending threaded stud 46 which extends through a threaded collar 47 on the upper side of the central recess 42. A lock nut 48 may also be provided for preventing subsequent rotation of the contact element 45 after it has once been adjusted to its desired position. As will be at once apparent to those skilled in the art, after the auxiliary member 20 has been assembled on the steering wheel and the split ring 37 snapped into place beneath spokes 3, the adjustable contact element 45 may be screwed down until it just touches circuit closing element 12 when the attaching ring 37 is in engagement with the undersides of spokes 3. If it is found that the resilient supporting ring 13 of the circuit closing element 12 is too stiff for desired operation, adjustable contact element 45 may be screwed further down thus overcoming some of the stiffness of supporting ring 13 and permitting manual manipulation of the auxiliary member to effect downward depression of the circuit closing element 12 in response to a lighter touch.

A different means for securing the ornamental emblem plate 41 to the central portion 21 of the auxiliary member 20 is also shown in Figure 6. Emblem plate 41 is provided with a plurality of downwardly extending resilient fingers 49 which are bent first outwardly and then inwardly to form hump portion 50. The side wall 51 of recess 42 is bent inwardly near its outer opening, thus providing an opening for the recess 42 which is slightly less in diameter than the diameter of the lower part of the recess. Emblem plate 41 may thus be snapped into retaining engagement on central portion 21 by reason of the fact that the resilient fingers 49 are cammed over the outer edge 52 of the central recess 42 into engagement with the wall portion 51 at a point near its maximum diameter. To remove the emblem plate 41 to obtain access to the adjusting stud 46 of the adjustable contact element 45, it is simply necessary to insert any suitable prying tool such as a small screw driver between the outer edge 52 of recess 42 and the corner of the emblem plate 41 and pry the latter out of engagement from the wall 51 of central recess 42.

In Figures 7 and 8 of the drawings a different modification of the invention is shown which is particularly applicable to steering wheels of the "banjo" type. More particularly steering wheel 53 is illustrated which includes in general a central hub portion 54, a plurality of radial spoke arms 55, and a rim 56. As may be seen in Figure 7 of the drawings, each spoke or spoke arm 55 of steering wheel 53 is made up of a number of relatively small rods 57 which are maintained in spaced relationship with respect to each other by means of a spacer clip 58. The hub and rim parts 54 and 56 of the steering wheel 53 may be formed of hard rubber, some suitable resinous condensation product, or any other suitable material. When hub 54 of steering wheel 53 is formed of a material other than metal, it is provided with an inner metallic hub 59 which is permanently formed therein.

Although not shown in the drawings, it is to be understood that this inner hub 59 is of the type almost universally employed in the automobile industry and includes a central aperture which extends over the steering rod of the steering wheel assembly and is also provided with suitable apertures on either side of the central aperture to permit the circuit closing element actuating mechanism including the actuating prongs 60 and 61 to extend therethrough. Actuating prongs 60 and 61 are preferably flattened at their lower extremities as at 62 and 63 for engagement with the switch mechanism of the circuit which is desired to be opened and closed. The upper ends of the actuating prongs 60 and 61 are secured to the circuit closing element in the manner described in connection with the preferred embodiment of the invention.

Although a specific type of steering wheel has been described above, it is, of course, to be understood that the particular shape and configuration of and structural details of the steering wheel assembly may vary through wide limits without departing from the spirit and scope of this invention, and it is only described as being of a form to which the novel auxiliary member presently to be described may be readily associated with.

The novel auxiliary member in this embodiment of the invention is similar in its general configuration to that previously described and includes in general a central portion 64 and a clover-leaf outer portion 65. Central portion 64 as previously described has a downwardly depending outer portion 66 on the inner side of which is formed two grooves 67 and 68. Groove 67 has mounted therein the clover-leaf rods 69, 70, and 71 in the manner previously described. The lower groove 68 within which the resilient split ring 72 is adapted to be snapped is made slightly larger to permit a cushioning element such as a rubber sleeve 73 to be mounted on the split ring 72. By providing resilient split ring 72 which is of the same general form as that shown in Figure 4 of the drawings with a cushioning sleeve 73, a metal-to-metal contact between the split ring 72 and the spoke arms 55 of the steering wheel 53 is avoided. This is particularly desirable when an auxiliary member of the type described herein is employed on a "banjo" type steering wheel since otherwise the auxiliary member would tend to rattle on the steering wheel.

In the modification of this invention shown in Figures 7 and 8, the upper part of the central portion 64 of the auxiliary member has been cut out, or in other words, the central portion 64 is in the form of an annular ring rather than in the form of a solid cup-shaped member. The inner marginal edge 74 of the central portion or annular ring 64 is turned downwardly to bear against the circuit closing element 75 with which the actuating prongs 60 and 61 are connected. From a cursory inspection of Figure 8 of the drawings, it will be observed that the central portion 64 is adapted to be fitted snugly over the top of the circuit closing element or button 75. By providing a ring-shaped central portion 64 on the auxiliary member, the existing ornamentation of the circuit closing element or button 75 is not detracted from. Furthermore, with this form of construction, it is impossible to effect actuation of the circuit closing element 75 by direct pressure thereon rather than by applying pressure through manual manipulation of the clover-leaf auxiliary member.

From the above description it will be at once apparent that I have provided an extraordinarily effective auxiliary member for circuit closing elements which may readily and quickly be mounted in desired position on a steering wheel assembly by an unskilled person. The clover-leaf arrangement of the outer portion of the auxiliary member which is adapted to be manually manipulated to effect operation of the circuit closing element provides an extraordinarily effective means of transmitting a finger-tip pressure on any point along the outer edge of the clover-leaf construction to two spaced points on the central hub portion of the auxiliary member. As will at once be apparent any arrangement of an auxiliary member which includes a central hub portion, a plurality of radial arms, and an outer ring for manual manipulation is adapted to transmit downward pressure on the outer ring to only a single point on the central portion of the auxiliary member. The clover-leaf arrangement is, furthermore, advantageous by virtue of the fact that it is adapted to lie between adjacent spokes of the steering wheel and in substantially the plane of the steering wheel.

While I have shown particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. As an article of manufacture for a spoked steering wheel having on the top side thereof a centrally disposed depressible circuit closing element, an auxiliary actuating member for said element comprising a central portion for disposition over said element, a plurality of portions extending out from said central portion between the spokes of said wheel which are adapted to effect operation of said element when depressed, and a detachable fastening element engageable with said central portion and extending below the spokes of said wheel.

2. As an article of manufacture for a spoked steering wheel having on the top side thereof a centrally disposed depressible circuit closing element, an auxiliary actuating member for said element comprising a central portion for disposition over said element, a plurality of portions extending out from said central portion between the spokes of said wheel which are adapted to effect operation of said element when depressed, said central portion having a downwardly extending flange, and a detachable fastening element disposed below the spokes of said wheel adapted to be snapped into securing engagement with said flange.

3. As an article of manufacture for a spoked steering wheel having on the top side thereof a centrally disposed depressible circuit closing element, an auxiliary actuating member for said element comprising a central portion for disposition over said element having its outer marginal edge bent downwardly below said spokes, a plurality of portions extending out from said central portion between the spokes of said wheel which are adapted to effect operation of said element when depressed, and a resilient split ring adapted to make a snap-on engagement with the lower edge portion of said flange.

4. As an article of manufacture for a spoked steering wheel having on the top side thereof a centrally disposed depressible circuit closing element, an auxiliary actuating member for said element comprising a central portion for disposition over said element having its outer marginal edge bent downwardly below said spokes, a plurality of portions extending out from said central portion between the spokes of said wheel which are adapted to effect operation of said element when depressed, said flange having an inwardly facing annular groove therein, and a resilient split ring disposed below the spokes of said steering wheel adapted to be snapped into said groove, thereby to detachably retain said auxiliary member on said steering wheel.

5. As an article of manufacture for a spoked steering wheel having on the top side thereof a centrally disposed depressible circuit closing element, an auxiliary actuating member for said element comprising a central cup shaped portion for disposition over said element, and an open clover-leaf shaped outer portion extending out from said central portion, the leaves of said outer portion being adapted to be disposed between adjacent spokes of said steering wheel.

6. As an article of manufacture for a spoked steering wheel having on the top side thereof a centrally disposed depressible circuit closing element, an auxiliary actuating member for said element comprising a central hub portion for disposition over said element, an outer portion for manual manipulation carried by said hub portion, means for detachably securing said auxiliary member to said steering wheel, and a plurality of resilient fingers secured to the underside of and concealed by said central hub portion and bearing on the upper side of said steering wheel, thereby to resiliently float said auxiliary member over said circuit closing element.

7. As an article of manufacture for a spoked steering wheel having on the top side thereof a centrally disposed depressible circuit closing element, an auxiliary actuating member for said element comprising a central portion for disposition over said element, an outer portion for manual manipulation, means for detachably securing said auxiliary member to said steering wheel, and a plurality of resilient fingers secured to said central portion and adapted to extend downwardly into member-supporting engagement on the spokes of said steering wheel.

8. As an article of manufacture for a spoked steering wheel having on the top side thereof a centrally disposed depressible circuit closing element, an auxiliary actuating member for said element comprising a central portion for disposition over said element, an outer portion for manual manipulation, means for detachably securing said auxiliary member to said steering wheel, said central portion having a central recess therein, and an ornamental emblem plate adapted to be snapped into said recess.

9. As an article of manufacture for a spoked steering wheel having on the top side thereof a centrally disposed depressible circuit closing element, an auxiliary actuating member for said element comprising a central portion for disposition over said element, an outer portion for manual manipulation, means for detachably securing said auxiliary member to said steering wheel, said central portion having a central recess therein, and an ornamental emblem plate having a plurality of downwardly extending spring fingers thereon arranged for frictional engagement with the wall of said recess.

10. As an article of manufacture for a spoked steering wheel having on the top side thereof a centrally disposed depressible circuit closing element, an auxiliary actuating member for said element comprising a central portion for disposition over said element, an outer portion for manual manipulation, means for detachably securing said auxiliary member to said steering wheel, said central portion having a central recess therein, and means for adjusting the spacing between said central portion and said circuit closing element including an adjusting element disposed in said recess, and an ornamental cap for covering said recess having means thereon for making a snap-on engagement with said central portion of said auxiliary member.

11. As an article of manufacture for a spoked steering wheel having on the top side thereof a centrally disposed depressible circuit closing element, an auxiliary actuating member for said element comprising a central portion for disposition over said element, and an outer portion for manual manipulation, and a circular clamping ring for disposition beneath the spokes and around the hub of said wheel arranged for snap-on engagement with said auxiliary member.

12. As an article of manufacture for a spoked steering wheel having on the top side thereof a centrally disposed depressible circuit closing element, an auxiliary actuating member for said element comprising a central portion for disposition over said element, and an outer portion for manual manipulation, a circular clamping ring for disposition beneath the spokes and around the hub of said wheel arranged for snap-on engagement with said auxiliary member, and cushioning means on said ring for engaging the spokes of said steering wheel.

13. As an article of manufacture for a spoked steering wheel having on the top side thereof a centrally disposed depressible circuit closing element, an auxiliary actuating member for said element comprising a central portion adapted to be snugly mounted on the top of said circuit closing element, an outer open clover-leaf portion through which manual manipulation of said circuit closing element is effected, and a circular clamping ring for disposition beneath the spokes and around the hub of said wheel arranged for snap-on engagement with said auxiliary member.

14. As an article of manufacture for a spoked steering wheel having on the top side thereof a centrally disposed depressible circuit closing element, an auxiliary actuating member for said element comprising a central hub portion for disposition over said element, and an outer portion for manual manipulation including a plurality of wire loops extending outwardly from said hub portion.

15. As an article of manufacture for a spoked steering wheel having on the top side thereof a centrally disposed depressible circuit closing element, an auxiliary actuating member for said element comprising a central hub portion for disposition over said element, and an outer portion for manual manipulation including a plurality of wire loops extending out from said hub portion, the inner ends of each of the loops being spaced from each other at the point at which they engage said central hub portion.

16. As an article of manufacture for a spoked steering wheel having on the top side thereof a centrally disposed depressible circuit closing element, an auxiliary actuating member for said element comprising a central hub portion for disposition over said element, an outer portion for manual manipulation including at least one wire loop extending outwardly from said hub portion, and means for detachably securing said auxiliary member to said steering wheel.

17. In combination, a steering wheel having a rim and a few groups of closely spaced spokes leaving large sectors between the groups of spokes, and a horn control mechanism comprising arms radiating out part way to said rim at each side of each of said unobstructed sectors, ring segments joining the arms at the sides of each of said unobstructed sectors, resilient means for holding said ring segments in a predetermined position with respect to said steering wheel, and means at the center of said steering wheel for causing a horn to blow when any of said ring segments are deflected from said predetermined position.

18. In combination, a steering wheel having a rim and spokes widely spaced apart so as to leave large sectors between spokes, an interrupted ring formed of segments lying between said spokes, said interrupted ring being located where it would intersect the spokes if it were continuous, arms extending alongside of said spokes from the center of said steering wheel and supporting said segments, and means operatively associated with said arms for causing a horn to blow in response to a displacement of any one of said segments.

19. In combination, a steering wheel having a rim and spokes, some of which spokes are widely spaced apart so as to leave large sectors therebetween, an interrupted ring formed of segments lying in said sectors between said spaced spokes on a circle intersecting all of said spokes, arms extending alongside of said spaced spokes and supporting said segments at their outer ends, said arms being located with respect to said steering wheel partly by fulcrums near their inner ends, and means operatively connected to the inner ends of said arms for causing a horn to blow whenever any one of said segments is pushed up out of line with said spokes and rocks one or more of said arms about the fulcrum associated therewith.

20. In combination with a steering wheel having a hub, a rim, and spokes, some of which spokes are widely spaced apart so as to leave large sectors therebetween, an interrupted ring formed of segments lying in said sectors between said spaced spokes on a circle parallel to said steering wheel rim and lying at least as low as said spokes, arms extending alongside of said spaced spokes and having their outer ends joined to the ends of said segments, said arms being located with respect to said steering wheel partly by fulcrums near their inner ends, and means operatively connected to the inner ends of said arms for causing a horn to blow whenever any one of said segments is pushed up out of its normal position in said circle and rocks one or more of said arms about the fulcrum associated therewith.

GEORGE ALBERT LYON.